(12) United States Patent
Haubennestel et al.

(10) Patent No.: US 6,596,816 B1
(45) Date of Patent: *Jul. 22, 2003

(54) DISPERSING AGENTS FOR PIGMENTS OR EXTENDERS BASED ON ACRYLIC ACID ALKYL ESTER POLYMERS

(75) Inventors: Karlheinz Haubennestel, Wesel (DE); Wolfgang Pritschins, Wesel (DE); Ulrich Orth, Wesel (DE)

(73) Assignee: BYK-Chemie GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,613

(22) Filed: May 11, 1998

(30) Foreign Application Priority Data

May 24, 1997 (DE) .......................... 197 21 728

(51) Int. Cl.$^7$ ............................ C08F 8/14; C08F 8/32; C08F 220/10; C08F 220/52
(52) U.S. Cl. .................... 525/328.9; 516/27; 516/29; 525/329.6; 525/329.9; 525/330.5; 525/382; 525/384
(58) Field of Search .................. 516/27, 29; 525/330.5, 525/329.9, 375, 382, 329.6, 328.9, 384

(56) References Cited

U.S. PATENT DOCUMENTS

| | | | |
|---|---|---|---|
| 2,595,907 A | * 5/1952 | Thomas et al. | 526/307 |
| 2,980,657 A | * 4/1961 | Melamed | 526/307 |
| 3,069,390 A | * 12/1962 | Kline et al. | 525/330.5 |
| 3,980,602 A | 9/1976 | Jakubauskas | 524/431 |
| 4,060,679 A | * 11/1977 | Naarmann et al. | 526/304 |
| 4,078,926 A | 3/1978 | Gibson et al. | 430/120 |
| 4,120,839 A | * 10/1978 | Emmons et al. | 525/330.5 |
| 4,303,563 A | * 12/1981 | Emmons et al. | 525/330.5 |
| 4,647,647 A | * 3/1987 | Haubennestel et al. | 528/83 |
| 5,057,579 A | 10/1991 | Fock et al. | 525/330.6 |
| 5,115,040 A | 5/1992 | Fock et al. | 525/330.5 |
| 5,133,898 A | 7/1992 | Fock et al. | 516/30 |
| 5,244,979 A | * 9/1993 | Yamamoto et al. | 525/329.9 |
| 5,338,485 A | 8/1994 | Fock et al. | 525/330.6 |
| 5,414,020 A | 5/1995 | Heller et al. | 525/330.5 |
| 5,516,826 A | * 5/1996 | Schilling | 525/329.9 |
| 5,519,093 A | 5/1996 | Pinschmidt, Jr. et al. | 525/353 |
| 5,717,048 A | * 2/1998 | Tsubaki et al. | 526/287 |
| 5,744,523 A | * 4/1998 | Barkowsky et al. | 516/32 |

FOREIGN PATENT DOCUMENTS

| | | | |
|---|---|---|---|
| EP | 0 311 157 | | 4/1989 |
| EP | 0 318 999 | | 6/1989 |
| EP | 0 718 318 | | 6/1996 |
| GB | 2248234 | * | 4/1992 |
| JP | 6-16849 A2 | * | 1/1994 |
| WO | WO 93/02131 | | 2/1993 |

OTHER PUBLICATIONS

DWPI on WEST, week 199902, London: Derwent Publications, Ltd., AN 1985–231484, Class A14, EP 154678 A (BYK–Chemie GmbH) abstract, 1985.*

Database WPINDEX on Questel, week 9018, London: Derwent Publications Ltd., AN—90–133131, DE 3842201 C (Goldschmidt AG TH), abstract, 1990.*

Database WPINDEX on Questel, week 9419, London: Derwent Publications Ltd., AN—94–027391, EP 595129 A2 (Goldschmidt AG TH), abstract, 1994.*

WSCA Abstract 105708: Abstract of article from *Chem. Prum. Journal*, vol. 29, No. 9, pp. 470–474, 1979 Month unknown.

Jan. 25, 1994, CAPLUS Abstract 1994:437310 of Japanese Patent No. 6–16849, 1/94.

Apr. 26, 1994, CAPLUS Abstract 1994:580535 of Japanese Patent No. 6–116323, 4/94.

Helmut Ritter et al., "Reactive comb–like polymers: Influence of structure and phase transition on the aminolysis of polyl[(alkyl acrylate)–co–[methyl 2–(N–acryloylamino)–2–methoxyacetate]]" *Makromol. Chem., Rapid Commun.*, vol. 12, pp. 403–308, 1991: Month unknown.

* cited by examiner

*Primary Examiner*—Daniel S. Metzmaier
(74) *Attorney, Agent, or Firm*—Schwegman, Lundberg, Woessner & Kluth, P.A.

(57) ABSTRACT

The present invention relates to dispersing agents for pigments or extenders based on acrylic acid alkyl ester polymers, wherein at least part of the ester groups of the polymers is reacted to form acid amides, wherein the dispersing agent is obtainable by the aminolysis of ester groups of the polymers by means of amines, wherein, for the aminolysis, at least one amine is used from the group comprising a) amines of general formula $NH_2—R^1—NR^2R^3$, wherein $R^1$ is a divalent alkylene radical comprising 2–4 carbon atoms and $R^2$ and $R^3$ are aliphatic and/or alicyclic alkyl radicals which comprise 1–12, preferably 1–6 carbon atoms and which can be the same or different. The invention also relates to the use of the dispersing agents according to the invention for the production of pigment concentrates and coating media, and to a process for producing the dispersing agents.

14 Claims, No Drawings

DISPERSING AGENTS FOR PIGMENTS OR EXTENDERS BASED ON ACRYLIC ACID ALKYL ESTER POLYMERS

This invention relates to dispersing agents for pigments or extenders based on acrylic acid alkyl ester polymers, wherein at least part of the ester groups of the polymers are reacted to form acid amides, and to a process for producing dispersing agents of this type. The invention also relates to the use of the dispersing agents for the production of pigment concentrates and coatings.

According to the prior art, polyacrylic acid esters comprising acidic and basic groups, which can also be converted into salts, are used as dispersing agents. These are produced by the polymerisation of corresponding monomeric acrylic acid esters, such as ethyl acrylate, n-butyl acrylate, 2-ethylhexyl acrylate, lauryl acrylate, 2-hydroxyethyl acrylate and alkoxylation products thereof, and of acrylic acid and dimethylaminoethyl acrylate, for example. For these polymers, other monomers comprising vinyl double bonds can also be used in conjunction during polymerisation, such as styrene, vinylpyridine, vinylimidazole and alkyl vinyl ethers for example (EP 0 311 157, U.S. Pat. No. 3,980,602).

However, proposals have also been made regarding how dispersing agents such as these can be produced by a transesterification reaction of polyacrylic acid esters, whereby the alkyl group is replaced by longer chain, saturated or unsaturated alcohols, polyoxyalkylene monoalcohols or dialkylaminoalkanols (EP 0 595 129, DEP 3 906 702, DEP 3 842 201, DEP3 842 202).

The advantage of transesterification is stated to be the considerably narrower molecular weight distribution of polymers produced in this manner, compared with polymers produced by the polymerisation of monomers. Moreover, it is claimed that these polymers are free from interfering and toxic monomer fractions.

These products according to the prior art have the disadvantage that defined monomers which are particularly suitable for producing these polymers with a heterocyclic structure, for example, are not available commercially.

Secondly, it has been shown that the basic transesterification products described in EP 0 595 129 do not impart a satisfactory stability to dispersed pigments, i.e. the pigments flocculate again after dispersion and do not exhibit the optimum transparency and gloss development.

It is an object of the present invention to provide polyacrylic acid compounds which do not have the above disadvantages or only to a substantially lesser extent and to enable achieving a broad variety of polyacrylic acid compounds.

In this manner, acrylic acid ester/N-alkylacrylic acid amide copolymers can be obtained, the acrylic acid amides of which are not commercially available as monomers.

Surprisingly, it has been shown that significant improvements in the dispersing and stabilising effect can be achieved for acrylate polymers such as these, which are produced by a polymer analogous reaction, if the corresponding amines are used, at least in part, instead of alcohols during the reaction of the alkyl acrylates.

With suitable catalysts, such as paratoluenesulphonic acid or $H_2SO_4$ for example, aminolysis of the ester bond proceeds similarly to transesterification, with elimination of the alkanol from the polyalkyl acrylate.

In contrast, the aminolysis of acrylic acid/acrylic acid ester copolymers proceeds without further addition of a catalyst, since the carboxyl groups themselves are already catalytically active.

The object of the present invention is achieved by the provision of dispersing agents for pigments or extenders which are based on acrylic acid alkyl ester polymers, in which at least part of the ester groups of the polymer is reacted to form acid amides, wherein the dispersing agent is obtainable by the aminolysis of ester groups of the polymers by means of amines, wherein, for the aminolysis, at least one amine can be used from the group comprising a) amines of general formula $NH_2$—$R^1$—$NR^2R^3$, wherein $R^1$ is a divalent alkylene radical comprising 2–4 carbon atoms and $R^2$ and $R^3$ are aliphatic and/or alicyclic alkyl radicals which comprise 1–12, preferably 1–6 carbon atoms and which can be the same or different, and b) amines of general formula $NH_2$—$R^1$—Z, wherein $R^1$ is a divalent alkylene radical comprising 2–4 carbon atoms and Z is a 5- or 6-membered N-containing heterocycle which can comprise up to 2 nitrogen atoms or which can additionally comprise oxygen.

In addition to these amines, one or more amines can also be used from the group comprising c) saturated or unsaturated aliphatic amines comprising 6–22 carbon atoms, d) alicyclic amines comprising up to 6 carbon atoms, e) aryl-substituted alkylamines and f) polyoxyalkylene amines $NH_2$—$R^1$—[O—$R^2$—]$_x$O—$R^3$, wherein $R^1$ is a divalent alkylene radical comprising 2–3 carbon atoms, $R^2$ is a divalent alkylene radical comprising 2–4 carbon atoms and $R^3$ is an alkyl radical comprising 1–4 carbon atoms.

The acrylic acid alkyl ester polymers may contain, as a comonomer, one or more monomers from the group comprising itaconic acid esters, maleic acid esters, methacrylic acid esters, (meth)acrylic acid, styrene, alkyl vinyl ethers, vinyl acetate or mixtures thereof, and preferably have a weight average molecular weight of 1000–50,000. At lower molecular weights, the acrylic acid ester polymers loose some efficiency; at higher molecular weights their processability decreases considerably due to higher viscosities. The acrylic acid alkyl ester polymers most preferably have a molecular weight of 2000 to 20,000.

The dispersing agents can also be used in the form of salts of the amino-functional polymers produced by aminolysis with a) and/or b). Phosphoric acid or phosphoric acid esters and/or sulphonic acids and/or carboxylic acids are suitable for salt formation.

Components a) and/or b) and optionally c) to f) are used in amounts such that preferably 1 to 50%, more preferably 5 to 40% and most preferably 10 to 30% of the groups which are capable of amidisation are reacted.

Aliphatic diamines comprising a tertiary amino group and a primary or secondary amino group, such as 2-(diethylamino)ethylamine, 3-(dimethylamino) propylamine, 3-(diethylamino)propylamine or 1-diethylamino-4-aminopentane for example, are used as component a) in the polyacrylates to be used according to the invention. A particularly preferred component a) is $NH_2$—$(CH_2)_3$—$N(CH_3)_2$(dimethyl-aminopropylamine).

Heterocyclic amines comprising an additional exocyclic primary or secondary amino group, such as N-(3-aminopropyl)imidazole, N-(3-aminopropyl)morpholine or N-(2-aminoethyl)-piperidine for example, are used as components b). A particularly preferred component b) is N-(3-aminopropyl)imidazole.

Components a) and b) can be used on their own or jointly in any desired ratio.

In addition, components c)–f) can be used on their own or in admixture for the polymer analogous reaction.

2-ethylhexylamine, oleylamine or stearylamine can be used as component c) for example; cyclohexylamine or dicyclohexylamine can be used as component d) for example; benzylamine can be used as component e) for example; the polyoxyalkylene amines which are known by trade name Jeffamin® can be used as component f) for example.

In this respect, it does not matter whether the amines are reacted as a mixture or successively in several steps.

In addition, alcohols can also be incorporated by transesterification into the polymers according to the invention during aminolysis with the amines described in a)–f). This is advantageous if solubility and/or compatibility problems arise at high degrees of conversion of the ester groups with the amines listed under a)–f) to form the corresponding amides. In situations such as these, the remaining ($C_1$–$C_4$) alkyl ester groups can be replaced by longer chain substituents, such as oleyl alcohol, stearyl alcohol or benzyl alcohol for example, by transesterification.

Aminolysis of the polyacrylic acid esters proceeds in the manner known in the art, in the presence of catalysts, such as p-toluenesulphonic acid or $H_2SO_4$ for example, at reaction temperatures of about 130–210° C., optionally in the presence of a suitable solvent. The alcohol which is evolved in the course of this procedure can be distilled off, during the reaction or after the reaction is complete, according to choice, or can remain in the reaction mixture.

The dispersing agents according to the invention normally used in an amount of 0.5 to 100, preferably 10 to 75, most preferably 25–60 parts by weight, with respect to 100 parts by weight of the solid to be dispersed. However, this depends on the surface area of the solid to be dispersed which is to be covered. For example, carbon black requires higher amounts of dispersing agents than does $TiO_2$. 100 parts by weight can also be exceeded in this respect. The dispersing agents are generally deposited on the solids in the presence of organic solvents and/or water. However, they can also be deposited directly on the solids to be dispersed.

The solids which can be used are the organic and inorganic pigments which are known to one skilled in the art, and which are listed both in the Pigment Handbook, Vol. 1–3, John Wiley & Sons, New York 1988 and in Ullmann's Encyclopedia of Industrial Chemistry, 5th Edition, Vol. 20, pp. 213 et seq. (Phthalocyanines) and pp. 371 et seq. (Pigments, Organic). Carbon black, $TiO_2$, iron oxide pigments, phthalocyanines and azo pigments can be cited as examples here. Moreover, mineral extenders, e.g. calcium carbonate or calcium oxide, and also flame retardants, such as aluminium or magnesium hydroxide for example, can be dispersed. Matting agents, such as hydrated silicas for example, can also be dispersed and stabilised in an outstanding manner. Other examples are described in EP 0 318 999, for example.

The dispersing agents according to the invention are particularly suitable for the production of pigment concentrates. For this purpose, the compounds according to the invention are introduced into an organic solvent and/or water, and the pigments to be dispersed are added with stirring. In addition, these pigment concentrates may contain binder vehicles and/or other adjuvant substances. These pigment concentrates can be incorporated in various binder vehicles, such as alkyd resins, polyester resins, acrylate resins, polyurethane resins or epoxy resins for example. However, pigments can also be dispersed directly, solvent free, in the polyacrylates according to the invention, and are then particularly suitable for the pigmentation of thermoplastic and thermosetting plastics formulations.

The dispersing agents according to the invention are particularly suitable for the production of coatings, wherein a binder vehicle, optionally a solvent, pigments and/or extenders, the dispersing agent and optionally adjuvant substances are dispersed together.

PRODUCTION EXAMPLES

Production of Polyacrylates (Not According to the Invention)

The polyacrylates to be used for aminolysis were produced by methods which are generally known, e.g. by radical polymerisation. More special production methods such as anionic polymerisation or group transfer polymerisation could also be employed.

Production of Acrylic Acid Ester/N-alkylacrylic Acid Amide Copolymers by Aminolysis (According to the Invention)

Example 1

1600 g of a polyethyl acrylate with a weight average molecular weight of about 11,500 were mixed with 160 g diethylaminopropylamine. In addition, 3.6 g p-toluenesulphonic acid were added as a catalyst. The reaction mixture was heated to reflux (about 180° C.) under nitrogen. The boiling point fell to about 139° C., due to the ethanol evolved during the reaction. After about 12–15 hours the reaction was complete and the ethanol which was evolved was distilled off. The polymer obtained in this manner had a weight average molecular weight of 12,550 g/mole.

Example 2

1450 g of a poly-n-butyl acrylate with a weight average molecular weight of about 12,000 were mixed with 177 g dimethylaminopropylamine. In addition, 0.5 g p-toluenesulphonic acid were added as a catalyst. The reaction mixture was heated to reflux (about 180° C.) under nitrogen. The boiling point fell to about 130° C., due to the ethanol evolved during the reaction. After about 15–17 hours the reaction was complete and the n-butanol which was evolved was distilled off. The polymer obtained in this manner had a weight average molecular weight of 12,850 g/mole.

Example 3

52.9 g of one of the styrene/acrylate/acrylic acid copolymers, which had an acid number of about 53 (mg/g KOH) (Joncryl 611/S.C.Johnson Polymer) and a weight average molecular weight of about 7700, were dissolved in 59.15 g PMA and treated with 6.25 g (0.05 moles) aminopropylimidazole. The reaction mixture was heated to reflux (about 145° C.) under nitrogen. The reaction was complete after about 4–6 hours. The polymer obtained in this manner had a weight average molecular weight of 8250 g/mole. The acid number remained the same.

Example 4

100 g of the polymer produced as in example 1 were mixed with 10.7 g (about 0.1 mole) benzylamine. The reaction mixture was heated to reflux (about 200° C.) under nitrogen. After about 8 hours the reaction was complete and the ethanol which was evolved was distilled off.

Example 5

100 g of the polymer produced as in example 1 were mixed with 26.7 g (about 0.1 mole) oleylamine. The reaction mixture was heated to reflux (about 200° C.) under nitrogen. After about 8 hours the reaction was complete and the ethanol which was evolved was distilled off.

Example 6

100 g of the polymer produced as in example 2 were mixed with 10.7 g (about 0.1 mole) benzylamine. The reaction mixture was heated to reflux (about 200° C.) under nitrogen. After about 8 hours the reaction was complete and the n-butanol which was evolved was distilled off.

Example 7

100 g of the polymer produced as in example 2 were mixed with 26.7 g (about 0.1 mole) oleylamine. The reaction mixture was heated to reflux (about 200° C.) under nitrogen. After about 8 hours the reaction was complete and the n-butanol which was evolved was distilled off.

Example 8

100 g of the polymer produced as in example 1 were mixed with 62.3 g (about 0.1 mole) of a polyoxyalkylene amine (Pluriol® A520A/BASF). The reaction mixture was heated to reflux (about 200° C.) under nitrogen. After about 5 hours the reaction was complete and the ethanol which was evolved was distilled off.

Example 9

100 g of the polymer produced as in example 2 were mixed with 62.3 g (about 0.1 mole) of a polyoxyalkylene amine (Pluriol® A520A/BASF). The reaction mixture was heated to reflux (about 200° C.) under nitrogen. After about 5 hours the reaction was complete and the n-butanol which was evolved was distilled off.

Example 10

98.71 g of the polymer produced as in example 1 were mixed with 34.55 g methoxypolyethylene glycol (MW about 350). The reaction mixture was heated to 100° C. under nitrogen Then 0.33 g tetraisopropyl orthotitanate were added and the batch was stirred for 2 hours at 200° C. A further 0.33 g tetraisopropyl orthotitanate were then added and the batch was stirred for a further 2 hours at 200° C. The ethanol which was evolved was distilled off. 0.17 g tetraisopropyl orthotitanate was then added and the batch was stirred for 1 hour at 200° C. The ethanol which was evolved was distilled off.

Example 11

100.91 g of the polymer produced as in example 2 were mixed with 35.32 g methoxypolyethylene glycol (MW about 350). The reaction mixture was heated to 100° C. under nitrogen. Then 0.33 g tetraisopropyl orthotitanate were added and the batch was stirred for 2 hours at 200° C. A further 0.33 g tetraisopropyl orthotitanate were then added and the batch was stirred for a further 2 hours at 200° C. The n-butanol which was evolved was distilled off. 0.17 g tetraisopropyl orthotitanate was then added and the batch was stirred for 1 hour at 200° C. The n-butanol which was evolved was distilled off.

Example 12

94.80 g of the polymer produced as in example 1 were mixed with 20.15 g (about 0.1 mole) butyltriglycol. The reaction mixture was heated to 100° C. under nitrogen. 0.33 g tetraisopropyl orthotitanate were added and the batch was stirred for 2 hours at 200° C. A further 0.33 g tetraisopropyl orthotitanate were then added and the batch was stirred for a further 2 hours at 200° C. The ethanol which was evolved was distilled off. 0.17 g tetraisopropyl orthotitanate was then added and the batch was stirred for 1 hour at 200° C. The ethanol which was evolved was distilled off.

Example 13

105.14 g of the polymer produced as in example 2 were mixed with 22.34 g butyltriglycol. The reaction mixture was heated to 100° C. under nitrogen. Then 0.33 g tetraisopropyl orthotitanate were added and the batch was stirred for 2 hours at 200° C. A further 0.33 g tetraisopropyl orthotitanate were then added and the batch was stirred for a further 2 hours at 200° C. The n-butanol which was evolved was distilled off. 0.17 g tetraisopropyl orthotitanate was then added and the batch was stirred for 1 hour at 200° C. The n-butanol which was evolved was distilled off.

Example 14

98.20 g of the polymer produced as in example 1 were mixed with 26.37 g (about 0.1 mole) oleyl alcohol. The reaction mixture was heated to 100° C. under nitrogen. Then 0.33 g tetraisopropyl orthotitanate were added and the batch was stirred for 2 hours at 200° C. A further 0.33 g tetraisopropyl orthotitanate were then added and the batch was stirred for a further 2 hours at 200° C. The ethanol which was evolved was distilled off. 0.17 g tetraisopropyl orthotitanate was then added and the batch was stirred for 1 hour at 200° C. The ethanol which was evolved was distilled off.

Example 15

93.50 g of the polymer produced as in example 2 were mixed with 25.10 g (about 0.1 mole) oleyl alcohol. The reaction mixture was heated to 100° C. under nitrogen. Then 0.33 g tetraisopropyl orthotitanate were added and the batch was stirred for 2 hours at 200° C. A further 0.33 g tetraisopropyl orthotitanate were then added and the batch was stirred for a further 2 hours at 200° C. The n-butanol which was evolved was distilled off. 0.17 g tetraisopropyl orthotitanate was then added and the batch was stirred for 1 hour at 200° C. The n-butanol which was evolved was distilled off.

Example 16

104.52 g of the polymer produced as in example 1 were mixed with 21.95 g (about 0.1 mole) of an allyl polyether (Uniox PKA 5001/Nippon OIL & FATS Co., Ltd.). The reaction mixture was heated to 100° C. under nitrogen. Then 0.33 g tetraisopropyl orthotitanate were added and the batch was stirred for 2 hours at 200° C. A further 0.33 g tetraisopropyl orthotitanate were then added and the batch was stirred for a further 2 hours at 200° C. The ethanol which was evolved was distilled off. 0.17 g tetraisopropyl orthotitanate was then added and the batch was stirred for 1 hour at 200° C. The ethanol which was evolved was distilled off.

Example 17

98.45 g of the polymer produced as in example 2 were mixed with 20.67 g (about 0.1 mole) of an allyl polyether (Uniox PKA 5001/Nippon OIL & FATS Co., Ltd.). The reaction mixture was heated to 100° C. under nitrogen. Then 0.33 g tetraisopropyl orthotitanate were added and the batch was stirred for 2 hours at 200° C. A further 0.33 g tetraisopropyl orthotitanate were then added and the batch was stirred for a further 2 hours at 200° C. The n-butanol which was evolved was distilled off. 0.17 g tetraisopropyl orthotitanate was then added and the batch was stirred for 1 hour at 200° C. The n-butanol which was evolved was distilled off.

Example 18

1450 g of a polyethyl acrylate with a weight average molecular weight of about 49,000 were mixed with 14.3 g dimethylaminopropylamine. In addition, 0.7 g p-toluenesulphonic acid were added as a catalyst. The reaction mixture was heated to reflux (about 180° C.) under nitrogen. The boiling point fell to about 130° C., due to the ethanol evolved during the reaction. After about 15–17 hours the reaction was complete and the ethanol which was evolved was distilled off. The polymer obtained in this manner had a weight average molecular weight of 49,500 g/mole.

Comparative Example
Production of a Comparison Polymer by Transesterification (Not According to the Invention)

73.8 g of a polyethyl acrylate were mixed with 20 g toluene, 53.6 g oleyl alcohol, 23.4 g diethyl ethanolamine and 0.7 g tetraisopropyl orthotitanate and were stirred for 2 hours under nitrogen and under reflux (about 150° C.). A further 0.7 g tetraisopropyl orthotitanate were then added and the batch was again stirred for 2 hours under reflux (the temperature fell to about 124° C.). The ethanol which was evolved was distilled off with the toluene.

Examples of Use

In order to assess the compounds according to the invention, pigment concentrates were prepared without additional binder vehicles, and their viscosity, which is a measure of the dispersibility of a solid, was determined.

The viscosities of the pigment pastes were measured using a Rheolab MC 10 (supplied by Physic/Pacer). The gloss was determined according to DIN 67530. The haze parameter was determined using the "Haze-Gloss" instrument supplied by the Byk-Gardner company. Delta E was determined according to DIN 5033 using the "TCS" instrument supplied by the Byk-Gardner company.

For the preparation of the pigment pastes, the raw materials and the glass beads which were necessary for comminution were successively weighed into a 500 ml dispersing pot and were then dispersed for 40 minutes at 40° C., using a 40 mm Teflon disc.

The dispersed pastes were sieved through a paper sieve (mesh aperture 80 μm) and were introduced into glass bottles. Free-flowing pigment pastes were obtained, which had very good rheological properties.

These pigment pastes were then added to a two-component, isocyanate-crosslinking acrylate solution (Macrynal SM515; 70% in butyl acetate/Desmodur N75; 75% in xylene/MPA (1:1)) and to a white lacquer, which was also based on Macrynal SM515/Desmodur N75. High-gloss lacquer films were obtained.

Formulations:
Pigment pastes: data in grams

|  | Spezial-schwarz4 | Bayferrox 130M | Novo-permrot F3RK70 | Helio-genblau L7101F |
|---|---|---|---|---|
| Dowanol PMA | 58.0 | 21.5 | 61.5 | 67.0 |
| Dispersing agent | 12.0 | 8.5 | 8.5 | 13 |
| Aerosil 200 fumed silica |  | 1.00 |  |  |
| Spezialsehwarz4 carbon black pigment | 30.0 |  |  |  |
| Bayferrox 130M Red brown pigment, color index P.R. 101 |  | 69.0 |  |  |
| Novopermrot F3RK70 red pigment, color index P.R. 170 |  |  | 30.0 |  |
| Heliogenblau L7101F blue pigment color index P.R. 15:4 |  |  |  | 20.0 |
| Glass beads | 150 | 100 | 150 | 150 |
| Total | 100.0 | 100.0 | 100.0 | 100.0 |

Formulation:
Lacquer compositions: data in grams

|  | Spezial-schwarz4 | Bayferrox 130M | Novopermrot F3RK70 | Heliogenblau L7101F |
|---|---|---|---|---|
| Two-component clear lacquer | | | | |
| Clear lacquer | 12.40 | 11.50 | 11.60 | 10.70 |
| Hardener solution (Desmodur N 75) | 6.10 | 5.70 | 5.80 | 5.30 |
| Pigment paste | 1.50 | 2.80 | 2.60 | 4.00 |
| Total | 20.00 | 20.00 | 20.00 | 20.00 |
| Two-component white lacquer | | | | |
| Clear lacquer | 15.30 | 14.90 | 14.70 | 14.70 |
| Hardener solution (Desmodur N 75) | 4.40 | 4.10 | 4.00 | 4.00 |
| Pigment paste | 0.30 | 1.00 | 1.30 | 1.30 |
| Total | 20.00 | 20.00 | 20.00 | 20.00 |

Results
Paste viscosity (in mPas) at D[sec$^{-1}$]

|  |  | D = 10[sec$^{-1}$] | D = 100[sec$^{-1}$] | D = 1000[sec$^{-1}$] |
|---|---|---|---|---|
| Spezialschwarz 4 carbon black pigment | Comp. Example | 36182 | 4327 | 535 |
|  | Example 1 | 14096 | 2204 | 2093 |
|  | Example 14 | 5140 | 988 | 243 |
|  | Example 15 | 10819 | 1572 | 308 |
| Bayfexrox 130M Red brown pigment color index P.R. 101 | Comp. Example | 2747 | 984 | 421 |
|  | Example 1 | 2138 | 734 | 382 |
|  | Example 14 | 2435 | 762 | 416 |
|  | Example 15 | 1938 | 726 | 371 |
| Novoperm F3RK70 red pigment color index P.R. 170 | Comp. Example | 3216 | 1227 | 293 |
|  | Example 1 | 2425 | 987 | 208 |
|  | Example 14 | 2200 | 599 | 141 |
|  | Example 15 | 3095 | 872 | 206 |
| Heliogenblau L7101F blue pigment color index P.R 15:4 | Comp. Example | 10307 | 2353 | 375 |
|  | Example 1 | 9360 | 2176 | 332 |
|  | Example 14 | 9993 | 1620 | 250 |
|  | Example 15 | 9450 | 1825 | 283 |

-continued

Results

Gloss and haze in colouring lacquer; delta E in the white mixture

|  |  | Gloss | Haze | Delta E |
|---|---|---|---|---|
| Spezialschwarz | Comp. Example | 12 | 374 | 22.83 |
| 4 car black | Example 11 | 89 | 6 | 0.7 |
| pigment | Example 13 | 88 | 7 | 0.5 |
|  | Example 14 | 92 | 7 | 1.14 |
|  | Example 15 | 65 | 62 | 5.84 |
| Bayferrox | Comp. Example | 4 | 197 | 35.03 |
| 130M red- | Example 11 | 89 | 7 | 0.7 |
| brown pigment | Example 13 | 89 | 7 | 0.6 |
| color index | Example 14 | 92 | 13 | 0.43 |
| P.R. 101 | Example 15 | 93 | 14 | 0.71 |
| Novoperm | Comp. Example | 15 | 461 | 24.59 |
| F3RK70 | Example 11 | 89 | 8 | 1.9 |
| color index | Example 13 | 89 | 8 | 2.0 |
| P.R. 1704 | Example 14 | 93 | 18 | 5.46 |
|  | Example 15 | 87 | 79 | 4.02 |
| Heliogenblau | Comp. Example | 19 | 512 | 13.39 |
| L7101F blue | Example 11 | 89 | 10 | 8.5 |
| pigment color | Example 13 | 89 | 10 | 8.3 |
| index 15:4 | Example 14 | 92 | 23 | 2.47 |
|  | Example 15 | 92 | 14 | 0.91 | mat/22.05.07

What is claimed is:

1. A dispersing agent for pigments or extenders comprising comprising an acrylic ester-acrylamide polymer having a weight average molecular weight of 1,000 to 50,000, comprising aminolysing an acrylic acid alkyl ester polymer with at least one amine, wherein the acrylic acid alkyl ester polymer is a polymer of acrylic acid alkyl ester monomer alone or with one or more additional monomers selected form the group consisting of itaconic acid ester, maleic acid ester, (meth)acrylic acid ester, (meth)acrylic acid, styrene, alkyl vinyl ether and vinyl acetate, and the amine is selected from the group consisting of; amines of the formula $NH_2$—$R^1$—$NR^2R^3$, wherein $R^1$ is a divalent alkylene radical of 2–4 carbon atoms and $R^2$ and $R^3$ are aliphatic or alicyclic alkyl radicals of 1–12 carbon atoms which can be the same or different;

wherein at least part of the ester groups of the acrylic ester-acrylamide polymer are transesterified with at least one long chain alcohol selected from the group consisting of oleyl alcohol, stearyl alcohol, benzyl alcohol, methoxy polyethylene glycol, butyl triglycol, and allyl polyether.

2. A dispersing agent according to claim 1, wherein the alkyl radical of the acrylic acid alkyl ester polymer contains 1 to 4 C atoms.

3. A dispersing agent according to claim 1, further comprising using a catalyst for aminolysis.

4. A dispersing agent according to claim 1, wherein the acrylic ester-acrylamide polymer has a weight average molecular weight of 2000–20,000.

5. A dispersing agent according to claim 1, further comprising reacting an amino-functional polymer with a phosphoric acid, phosphoric ester, sulfonic acid or carboxylic acid to form an amine/acid salt and wherein the acrylic ester-acrylamide polymer is the amino-functional polymer.

6. A dispersing agent according to claim 1, wherein $R^2$ and $R^3$ are aliphatic or alicyclic alkyl radicals of 1–6 carbons or a combination thereof.

7. A dispersing agent according to claim 1, further comprising additionally aminolysing the acrylic acid alkyl ester polymer with one or more amines selected from the group consisting of c) saturated or unsaturated aliphatic amines of 6–22 carbon atoms, d) alicyclic amines of up to 6 carbon atoms, e) aryl-substituted alkylamines and f) polyoxyalkylene amines $NH_2$—$R^1$—$(O$—$R^2$—$)_xO$—$R^3$, wherein $R^1$ is a divalent alkylene radical of 2–3 carbon atoms, $R^2$ is a divalent alkylene radical of 2–4 carbon atoms and $R^3$ is an alkyl radical of 1–4 carbon atoms and x is an integer from 1 to 42.

8. A process for producing a dispersing agent comprising an acrylic ester-acrylamide polymer having a weight average molecular weight of 1,000 to 50,000, comprising aminolysing an acrylic acid alkyl ester polymer with at least one amine, wherein the acrylic acid alkyl ester polymer is a polymer of acrylic acid alkyl ester monomer alone or with one or more additional monomers selected form the group consisting of itaconic acid ester, maleic acid ester, (meth)acrylic acid ester, (meth)acrylic acid, styrene, alkyl vinyl ether and vinyl acetate, and the amine is selected from the group consisting of; amines of the formula $NH_2$—$R^1$—$NR^2R^3$, wherein $R^1$ is a divalent alkylene radical of 2–4 carbon atoms and $R^2$ and $R^3$ are aliphatic or alicyclic alkyl radicals of 1–12 carbon atoms which can be the same or different;

wherein at least part of the ester groups of the acrylic ester-acrylamide polymer are transesterified with at least one long chain alcohol selected from the group consisting of oleyl alcohol, stearyl alcohol, benzyl alcohol, methoxy polyethylene glycol, butyl triglycol, and allyl polyether.

9. The process of claim 8, further comprising additionally aminolysing with one or more amines selected from the group consisting of c) saturated or unsaturated aliphatic amines of 6–22 carbon atoms, d) alicyclic amines of up to 6 carbon atoms, e) aryl-substituted alkylamines and f) polyoxyalkylene amines $NH_2$—R1-(O—R2-)x-O—R3, wherein R1 is a divalent alkylene radical of 2–3 carbon atoms, R2 is a divalent alkylene radical of 2–4 carbon atoms and R3 is an alkyl radical of 1–4 carbon atoms, and x is an integer from 1 to 45.

10. The process of claim 2, wherein $R^2$ and $R^3$ are aliphatic and/or alicyclic alkyl radicals of 1–6 carbons or a combination thereof.

11. The process of claim 8, wherein the alkyl radical of the acrylic acid alkyl ester polymer contains 1 to 4 C atoms.

12. The process of claim 8, further comprising using a catalyst for aminolysis.

13. The process of claim 8, wherein the acrylic ester-acrylamide polymer has a weight average molecular weight of 2000–20,000.

14. The process of claim 8, further comprising reacting an amino-functional polymer with a phosphoric acid, phosphoric ester, sulfonic acid or carboxylic acid to form an amine/acid salt and wherein the acrylic ester-acrylamide polymer is the amino-functional polymer.

* * * * *